United States Patent
Ma et al.

(10) Patent No.: US 11,057,805 B2
(45) Date of Patent: Jul. 6, 2021

(54) MOBILITY MANAGEMENT METHOD, NETWORK SIDE DEVICE, INTERNET-OF-VEHICLES TERMINAL, AND SYSTEM

(71) Applicant: ZTE CORPORATION, Shenzhen (CN)

(72) Inventors: Wei Ma, Shenzhen (CN); Yaying Wang, Shenzhen (CN); Jianfeng Ding, Shenzhen (CN); Yong Lv, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/327,556

(22) PCT Filed: Jul. 28, 2017

(86) PCT No.: PCT/CN2017/094824
§ 371 (c)(1),
(2) Date: May 14, 2019

(87) PCT Pub. No.: WO2018/036338
PCT Pub. Date: Mar. 1, 2018

(65) Prior Publication Data
US 2019/0268816 A1    Aug. 29, 2019

(30) Foreign Application Priority Data

Aug. 22, 2016   (CN) .......................... 201610701096.3

(51) Int. Cl.
*H04W 36/00*   (2009.01)
*H04W 4/40*    (2018.01)
(Continued)

(52) U.S. Cl.
CPC .............. *H04W 36/03* (2018.08); *H04W 4/40* (2018.02); *H04W 4/44* (2018.02); *H04W 4/46* (2018.02);
(Continued)

(58) Field of Classification Search
CPC . H04W 36/00; H04W 36/0072; H04W 36/03; H04W 36/32; H04W 36/38;
(Continued)

(56) References Cited

U.S. PATENT DOCUMENTS

| | | | | |
|---|---|---|---|---|
| 2012/0252449 | A1* | 10/2012 | Ou | H04W 36/08 455/435.1 |
| 2012/0327909 | A1* | 12/2012 | Koike | H04W 24/08 370/331 |

(Continued)

FOREIGN PATENT DOCUMENTS

| | | |
|---|---|---|
| CN | 105517168 A | 4/2016 |
| WO | 2016022009 A1 | 2/2016 |

OTHER PUBLICATIONS

Huawei et al., "Mobility Management Optimization for PC5-Based V2X Device", SA WG2 Meeting #114 S2-161647, Apr. 15, 2016, section 2.2, and figure 1.
(Continued)

*Primary Examiner* — Quoc Thai N Vu
(74) *Attorney, Agent, or Firm* — Morgan, Lewis & Bockius LLP

(57) ABSTRACT

Disclosed in the present invention is a mobility management method. The method includes sending, by a network side device, a RRC connection reconfiguration message to an Internet of Vehicles terminal when determining that network handover is required to be performed for the Internet of Vehicles terminal; and receiving, by the Internet of Vehicles terminal, the RRC connection reconfiguration message sent (Continued)

When a network side device determines that network handover is required to be performed for an Internet of Vehicles terminal, send, by the network side device, a radio resource control (RRC) connection reconfiguration message to the Internet of Vehicles terminal — 101

Receive, by the Internet of Vehicles terminal, the RRC connection reconfiguration message sent by the network side device, and after completing reconfiguration of a radio resource according to the RRC connection reconfiguration message, the Internet of Vehicles terminal sends to the network side device a RRC connection reconfiguration completion message carrying current physical location information of the Internet of Vehicles terminal — 102 by the network side device, and after completing reconfiguration of a radio resource according to the RRC connection reconfiguration message, sending to the network side device a RRC connection reconfiguration completion message carrying current physical location information of the Internet of Vehicles terminal.

15 Claims, 5 Drawing Sheets

(51) Int. Cl.
    *H04W 36/38*  (2009.01)
    *H04W 64/00*  (2009.01)
    *H04W 4/46*   (2018.01)
    *H04W 72/00*  (2009.01)
    *H04W 4/44*   (2018.01)

(52) U.S. Cl.
    CPC ....... *H04W 36/00* (2013.01); *H04W 36/0072* (2013.01); *H04W 36/0085* (2018.08); *H04W 36/38* (2013.01); *H04W 64/00* (2013.01); *H04W 72/00* (2013.01)

(58) Field of Classification Search
    CPC ......... H04W 36/0061; H04W 36/0085; H04W 36/08; H04W 64/00; H04W 72/00; H04W 4/40; H04W 4/44; H04W 4/46; H04W 84/005; H04W 24/02; H04W 76/27; H04W 92/18; H04W 8/08; Y02D 70/21
    See application file for complete search history.

(56) References Cited

U.S. PATENT DOCUMENTS

| | | | |
|---|---|---|---|
| 2014/0044029 A1* | 2/2014 | Chou | H04W 52/0212 370/311 |
| 2015/0181373 A1 | 6/2015 | Xie et al. | |
| 2016/0227463 A1* | 8/2016 | Baligh | H04W 40/02 |
| 2018/0249388 A1* | 8/2018 | Baek | H04W 36/02 |

OTHER PUBLICATIONS

Chinese Office Action for Application No. 201610701096.3, dated Dec. 4, 2019, 15 pages.
European Office Action for Application No. 17842761.3, dated Jul. 15, 2020 10 pages.
Extended European Search Report for Application No. 17842761.3, dated Jun. 5, 2019, 17 pages.
International Search Report for Application No. PCT/CN2017/094824, dated Sep. 28, 2017, 5 pages.
LG Electronics Inc: "geo-information reporting", 3GPP Draft; R2-165594 Geo-Information Reporting, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016 Aug. 21, 2016 (Aug. 21, 2016), XP051127030, Retrieved from the Internet: URL:http://www.3gpp.org/ftp/Meetings_3GPP_SYNC/RAN2/Docs/ [retrieved on Aug. 21, 2016] p. 1-p. 2.
ZTE: "Geo based Resource Allocation for V2X over PC5", 3GPP Draft; R2-162399 Geo Based Resource Allocation, 3rd Generation Partnership Project (3GPP), Mobile Competence Centre; 650, Route Des Lucioles; F-06921 Sophia-Antipolis Cedex; France, vol. RAN WG2, No. Dubrovnik; Apr. 11, 2016-Apr. 15, 2016 Apr. 1, 2016 (Apr. 1, 2016), XP051082084, Retrieved from the Internet: URL:http://www.3gpp.org/ftp/tsg_ran/WG2_RL2/TSGR2_93bis/Docs/ [retrieved on Apr. 1, 2016] p. 1-p. 3; figure 1.

* cited by examiner

MOBILITY MANAGEMENT METHOD, NETWORK SIDE DEVICE, INTERNET-OF-VEHICLES TERMINAL, AND SYSTEM

CROSS-REFERENCE TO RELATED APPLICATION

This application is based upon and claims priority to PCT Application No. PCT/CN2017/094824 filed Jul. 28, 2017, which is based upon and claims priority to Chinese Patent Application No. 201610701096.3, filed Aug. 22, 2016, the entire contents of which are incorporated herein by reference.

TECHNICAL FIELD

The present disclosure relates to Internet of Vehicles technology, in particular to a mobility management method, a network side device, an Internet of Vehicles terminal and a system.

BACKGROUND

Generally, device-to-device (D2D) technologies can be divided into D2D discovery technology and D2D communication technology. The D2D discovery technology refers to a technology for deciding and/or determining whether first user equipment is adjacent to second user equipment, and the technical support is that the D2D user equipment can discover the other party by sending or receiving a discovery signal and/or information. The D2D communication technology refers to a technology in which some or all of the communication data between D2D user equipment can communicate directly without going through a network infrastructure. In conventional D2D communication technologies, a terminal obtaining D2D resource allocation includes two situations: the terminal automatically obtaining a communication resource from a resource pool and the terminal requesting a network side to allocate the communication resource. In the case of automatic obtaining, the terminal may independently select a communication resource for D2D communication based on resource pool information stored by itself or resource pool information obtained from the network side. In the case of requesting resource allocation to the network side, the terminal may request a communication resource from the network side by sending a scheduling request and a near field communication scheduling request.

Based on the characteristics and advantages of the D2D technologies, it has long been proposed to combine cellular wireless communication with D2D technologies to realize application of Internet of Vehicles. In a recent research of Internet of Vehicles technology for 3rd Generation Partnership Project (3GPP), it is proposed to combine the D2D technologies in 3GPP and Uu communication technology in a Long Term Evolution (LTE) network to realize a technical solution of vehicle-to-vehicle (V2V) and vehicle to any device (V2X) communication. Compared with ordinary single-point D2D communication, the introduction of D2D technologies into Internet of Vehicles communication will lead to a situation that too many terminals are located in the same location area, thereby resulting in that the resource allocation by the conventional D2D communication technology cannot meet the demands of Internet of Vehicles communication. Therefore, in order to optimize the resource allocation to the Internet of Vehicles terminals, the Internet of Vehicles technology requires the Internet of Vehicles terminals to report physical location information in time. In the related art, although a signaling message may be sent through an application layer or a related access layer during a connection establishment process of an Internet of Vehicles terminal to require the Internet of Vehicles terminal to report the physical location information, subsequent update of the location information of the Internet of Vehicles terminal is not considered. Moreover, change of location information of the Internet of Vehicles terminals will affect the allocation and optimization of the Internet of Things resources. If the location information of the Internet of Vehicles terminal cannot be updated in time, it may cause signaling load imbalance of the Internet of Vehicles terminal.

SUMMARY

To solve the above technical problems, embodiments of the present disclosure provide a mobility management method, a network side device, an Internet of Vehicles terminal, and a system.

The technical solutions of the present disclosure are implemented as follows.

The present disclosure provides a mobility management method, including:

sending, by a network side device, a RRC connection reconfiguration message to an Internet of Vehicles terminal when determining that network handover is required to be performed for the Internet of Vehicles terminal; and receiving, by the Internet of Vehicles terminal, the RRC connection reconfiguration message sent by the network side device, and after completing reconfiguration of a radio resource according to the RRC connection reconfiguration message, sending to the network side device a RRC connection reconfiguration completion message carrying current physical location information of the Internet of Vehicles terminal.

In the solution, the RRC connection reconfiguration message carries mobility management information.

In the solution, the RRC connection reconfiguration message carries information about a transmitting and/or receiving radio resource allocated to the Internet of Vehicles terminal for Internet of Vehicles communication.

In the solution, the method further includes: reporting, by the Internet of Vehicles terminal, a cell measurement report to the network side device.

In the solution, the network side device determining that network handover is required to be performed for the Internet of Vehicles terminal includes:

determining that network handover is required to be performed for the Internet of Vehicles terminal according to the received cell measurement report reported by the Internet of Vehicles terminal, and/or detecting that a radio resource is re-allocated to the Internet of Vehicles terminal.

In the solution, the method further includes:

determining, by the network side device, a neighboring Internet of Vehicles terminal that is located from the Internet of Vehicles terminal by a distance less than or equal to a first threshold according to the current physical location information of the Internet of Vehicles terminal, and obtaining a radio resource occupied by the neighboring Internet of Vehicles terminal;

allocating for the Internet of Vehicles terminal a radio resource that is in a frequency band different from that of the radio resource occupied by the neighboring Internet of Vehicles terminal, according to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

The present disclosure provides a mobility management method, which is applied to a network side device. The method includes:

sending a radio resource control RRC connection reconfiguration message to an Internet of Vehicles terminal when determining that network handover is required to be performed for the Internet of Vehicles terminal; and receiving a RRC connection reconfiguration completion message carrying current physical location information of the Internet of Vehicles terminal, which is sent by the Internet of Vehicles terminal.

In the solution, the RRC connection reconfiguration message carries mobility management information.

In the solution, the RRC connection reconfiguration message carries information about a transmitting and/or receiving radio resource allocated to the Internet of Vehicles terminal for Internet of Vehicles communication.

In the solution, determining that network handover is required to be performed for the Internet of Vehicles terminal includes:

determining that network handover is required to be performed for the Internet of Vehicles terminal according to a received cell measurement report reported by the Internet of Vehicles terminal, and/or detecting that a radio resource is re-allocated to the Internet of Vehicles terminal.

In the solution, the method further includes:

determining a neighboring Internet of Vehicles terminal that is located from the Internet of Vehicles terminal by a distance less than or equal to a first threshold according to the current physical location information of the Internet of Vehicles terminal, and obtaining a radio resource occupied by the neighboring Internet of Vehicles terminal;

allocating for the Internet of Vehicles terminal a radio resource that is in a frequency band different from that of the radio resource occupied by the neighboring Internet of Vehicles terminal, according to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

The present disclosure provides a mobility management method, which is applied to an Internet of Vehicles terminal. The method includes:

receiving a RRC connection reconfiguration message sent by a network side device; and sending a RRC connection reconfiguration completion message carrying current physical location information of the Internet of Vehicles terminal to the network side device after completing reconfiguration of a radio resource according to the RRC connection reconfiguration message.

In the solution, the RRC connection reconfiguration message carries mobility management information.

In the solution, the RRC connection reconfiguration message carries information about a transmitting and/or receiving radio resource allocated to the Internet of Vehicles terminal for Internet of Vehicles communication.

In the solution, the method further includes: reporting a cell measurement report to the network side device.

In the solution, the current physical location information of the Internet of Vehicles terminal carries current motion state information of the Internet of Vehicles terminal.

In the solution, the current motion state information of the Internet of Vehicles terminal includes at least one of: a current running speed, a running direction, and an acceleration of the Internet of Vehicles terminal.

The present disclosure provides a network side device, including: a first sending unit, a first processing unit, and a first receiving unit; wherein the first sending unit is configured to send a RRC connection reconfiguration message to an Internet of Vehicles terminal when the first processing unit determines that network handover is required to be performed for the Internet of Vehicles terminal; and the first receiving unit is configured to receive a RRC connection reconfiguration completion message carrying current physical location information of the Internet of Vehicles terminal, which is sent by the Internet of Vehicles terminal.

In the solution, the RRC connection reconfiguration message carries mobility management information.

In the solution, the RRC connection reconfiguration message carries information about a transmitting and/or receiving radio resource allocated to the Internet of Vehicles terminal for Internet of Vehicles communication.

In the solution, the first processing unit is configured to:

determine whether network handover is required to be performed for the Internet of Vehicles terminal according to a cell measurement report reported by the Internet of Vehicles terminal and received by the first receiving unit, and if it is so, determine that network handover is required to be performed for the Internet of Vehicles terminal, and/or detect whether a radio resource is re-allocated to the Internet of Vehicles terminal, and if it is so, determine that network handover is required to be performed for the Internet of Vehicles terminal.

In the solution, the network side device further includes an allocating unit; wherein the first processing unit is further configured to determine a neighboring Internet of Vehicles terminal that is located from the Internet of Vehicles terminal by a distance less than or equal to a first threshold according to the current physical location information of the Internet of Vehicles terminal, and obtain a radio resource occupied by the neighboring Internet of Vehicles terminal; and the allocating unit is further configured to allocate for the Internet of Vehicles terminal a radio resource that is in a frequency band different from that of the radio resource occupied by the neighboring Internet of Vehicles terminal, according to the radio resource occupied by the neighboring Internet of Vehicles terminal; or allocate for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal; or allocate for the Internet of Vehicles terminal a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

The present disclosure provides an Internet of Vehicles terminal, including: a second receiving unit, a second processing unit, and a second transmitting unit; wherein the second receiving unit is configured to receive a RRC connection reconfiguration message sent by a network side device; and the second sending unit is configured to send a RRC connection reconfiguration completion message carrying current physical location information of the Internet of Vehicles terminal to the network side device after the second processing unit completes reconfiguration of a radio resource according to the RRC connection reconfiguration message.

In the solution, the RRC connection reconfiguration message carries mobility management information.

In the solution, the RRC connection reconfiguration message carries information about a transmitting and/or receiving radio resource allocated to the Internet of Vehicles terminal for Internet of Vehicles communication.

In the solution, the second transmitting unit is further configured to report a cell measurement report to the network side device.

In the solution, the current physical location information of the Internet of Vehicles terminal carries current motion state information of the Internet of Vehicles terminal.

In the solution, the current motion state information of the Internet of Vehicles terminal includes at least one of: a current running speed, a running direction, and an acceleration of the Internet of Vehicles terminal.

The present disclosure provides a mobility management system, including: a network side device and an Internet of Vehicles terminal; wherein the network side device is configured to send a RRC connection reconfiguration message to an Internet of Vehicles terminal when determining that network handover is required to be performed for the Internet of Vehicles terminal; and the Internet of Vehicles terminal is configured to receive the RRC connection reconfiguration message sent by the network side device, and after completing reconfiguration of a radio resource according to the RRC connection reconfiguration message, send to the network side device a RRC connection reconfiguration completion message carrying current physical location information of the Internet of Vehicles terminal.

In the solution, the network side device may include the above network side device; and the Internet of Vehicles terminal may include the Internet of Vehicles terminal.

In the mobility management method, the network side device, the Internet of Vehicles terminal and the system provided by the embodiments of the present disclosure, when the network side device determines that network handover is required to be performed for an Internet of Vehicles terminal, the network side device sends a RRC connection reconfiguration message to the Internet of Vehicles terminal. After the Internet of Vehicles terminal completes the reconfiguration of the radio resource according to the RRC connection reconfiguration message, the Internet of Vehicles terminal sends an RRC connection reconfiguration completion message carrying current physical location information of the Internet of Vehicles terminal to the network side device. It can be seen that, in the embodiments of the present disclosure, when the network side device determines that network handover is required to be performed for an Internet of Vehicles terminal, the network side device sends a RRC connection reconfiguration message to the Internet of Vehicles terminal, so that after the Internet of Vehicles terminal completes the reconfiguration of the radio resource, the Internet of Vehicles terminal sends the current physical location information of the Internet of Vehicles terminal itself to the network side device. The network side device updates the location information of the Internet of Vehicles terminal according to the received current physical location information of the Internet of Vehicles terminal itself. In this way, the location information of the Internet of Vehicles terminal can be updated in time, thereby solving the problem in the related art that the location information of the Internet of Vehicles terminal cannot be updated in time.

In addition, the network side device optimizes the allocation of the radio resources of the Internet of Vehicles terminal according to the current physical location information of the Internet of Vehicles terminal and the radio resource occupied by the neighboring Internet of Vehicles terminal of the Internet of Vehicles terminal. In this way, the present disclosure can improve the effect of V2V/V2X communication performed by the Internet of Vehicles terminal, promote the load balancing of the signaling of the Internet of Vehicles terminals, thereby solving the problem of imbalance of signaling load on the Internet of Vehicles terminal.

DETAILED DESCRIPTION

First Embodiment

Figure 1:
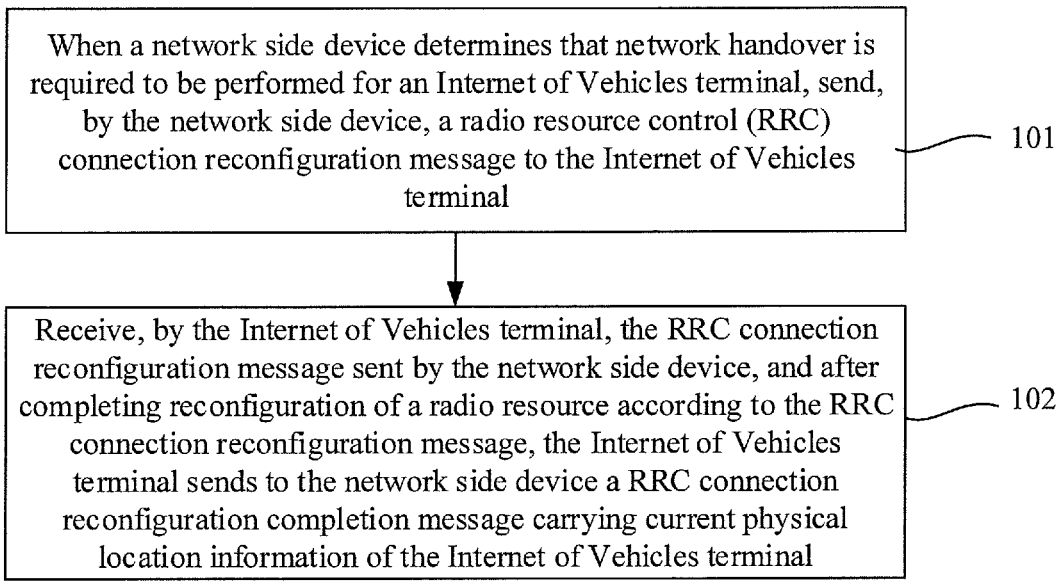
FIG. 1 is a schematic flowchart of a mobility management method according to a first embodiment of the present disclosure.

FIG. 1 is a schematic flowchart of a mobility management method according to a first embodiment of the present disclosure, and the method includes the following steps.

In step 101, when a network side device determines that network handover is required to be performed for an Internet of Vehicles terminal, the network side device sends a radio resource control (RRC) connection reconfiguration message to the Internet of Vehicles terminal.

Specifically, when the network side device determines that network handover is required to be performed for the Internet of Vehicles terminal, the network side device sends a RRC connection reconfiguration message to the Internet of Vehicles terminal, such that the Internet of Vehicles terminal performs reconfiguration of a radio resource and the Internet of Vehicles terminal obtains its current physical location information.

Here, the network side device determining that that network handover is required to be performed for the Internet of Vehicles terminal includes the network side device receiving a cell measurement report reported by the Internet of Vehicles terminal, and determining that network handover is required to be performed for the Internet of Vehicles terminal according to the cell measurement report, and/or the network side device detecting that a radio resource is re-allocated to the Internet of Vehicles terminal. For example, when the network side device detects, according to the cell measurement report reported by the Internet of Vehicles terminal, that a signal quality of a neighboring cell of the cell that the Internet of Vehicles terminal is currently located is better than a signal quality of the cell that the Internet of Vehicles terminal is currently located, the network device can determine that network handover is required to be performed for the Internet of Vehicles terminal.

Here, the network side device includes an evolved base station (eNB, an evolved Node B), a mobility management device, a gateway, a core network device, or an Internet of Vehicles server, etc., that is connected to the eNB. The RRC connection reconfiguration message sent by the network side device is forwarded to the Internet of Vehicles terminal via the eNB. That is, the network side device sends the message that is to be sent to the Internet of Vehicles terminal to the corresponding Internet of Vehicles terminal via the eNB. Similarly, the message that the Internet of Vehicles terminal needs to send to the network side device is also sent to the corresponding network side device via the eNB.

Here, the Internet of Vehicles terminal refers to a terminal implementing V2V/V2X communication depending on an LTE-Uu interface, and/or a Peripheral Component Interconnect (PCI) interface, and/or a Multimedia Broadcast Multicast Service (MBMS). The LTE-Uu interface refers to an interface between a UE (User Equipment) and an eNB in LTE.

Here, the RRC connection reconfiguration message may further carry mobility management information, configured to instruct the Internet of Vehicles terminal to perform network handover after receiving the RRC reconfiguration message. The RRC connection reconfiguration message also carries information about a transmitting and/or receiving radio resource allocated to the Internet of Vehicles terminal for Internet of Vehicles communication. The transmitting radio resource information refers to a radio resource required for transmitting a message when the Internet of Vehicles terminal performs Internet of Vehicles communications. The receiving radio resource information refers to a radio resource required for receiving a message when the Internet of Vehicles terminal performs Internet of Vehicles communications.

In step 102, the Internet of Vehicles terminal receives the RRC connection reconfiguration message sent by the network side device, and after completing reconfiguration of a radio resource according to the RRC connection reconfiguration message, the Internet of Vehicles terminal sends to the network side device a RRC connection reconfiguration completion message carrying current physical location information of the Internet of Vehicles terminal.

Specifically, the Internet of Vehicles terminal receives the RRC connection reconfiguration message sent by the network side device in step 101, and after completing reconfiguration of a radio resource according to the RRC connection reconfiguration message and obtaining its current physical location information, sends to the network side device a RRC connection reconfiguration completion message carrying the current physical location information of the Internet of Vehicles terminal, such that the network side device takes the received current physical location information of the Internet of Vehicles terminal as location information of the Internet of Vehicles terminal, that is, the network side device may update the location information of the Internet of Vehicles terminal.

In this embodiment, the current physical location information of the Internet of Vehicles terminal includes at least one of the following information: current global positioning system GPS location information, Beidou satellite positioning location information, pre-allocated physical location number information, location area information, and network-assisted positioning location information of the Internet of Vehicles terminal. The current physical location information of the Internet of Vehicles terminal may also be obtained by other positioning methods in the related art. The pre-allocated physical location number information may be number information defined by the user in advance for different areas, and when an Internet of Vehicles terminal is located in a certain area, the Internet of Vehicles terminal may obtain the physical location number information corresponding to the area.

Here, the current physical location information of the Internet of Vehicles terminal may further carry current motion state information of the Internet of Vehicles terminal. The current motion state information of the Internet of Vehicles terminal includes at least one of the following information: a current running speed, a running direction, an acceleration, a running time, a destination of the Internet of Vehicles terminal.

Further, the method further includes: receiving, by the network side device, a RRC connection reconfiguration completion message that is sent by the Internet of Vehicles terminal and carries current physical location information of the Internet of Vehicles terminal.

Specifically, the network side device receives the RRC connection reconfiguration completion message that is sent by the Internet of Vehicles terminal in step 102 and carries the current physical location information of the Internet of Vehicles terminal, and takes the received current physical location information of the Internet of Vehicles terminal as location information of the Internet of Vehicles terminal, that is, completes the update of the location information of the Internet of Vehicles terminal.

Further, the method further includes:

determining, by the network side device, a neighboring Internet of Vehicles terminal that is located from the Internet of Vehicles terminal by a distance less than or equal to a first threshold according to the current physical location information of the Internet of Vehicles terminal, and obtaining a radio resource occupied by the neighboring Internet of Vehicles terminal; and allocating for the Internet of Vehicles terminal a radio resource that is in a frequency band different from that of the radio resource occupied by the neighboring Internet of Vehicles terminal, according to the radio resource occupied by the neighboring Internet of Vehicles terminal;

or, allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal;

or, allocating for the Internet of Vehicles terminal a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

Here, after receiving the RRC connection reconfiguration completion message that is sent by the Internet of Vehicles terminal and carries the current physical location information of the Internet of Vehicles terminal, the network side device stores the current physical location information of the Internet of Vehicles terminal in the location information corresponding to the Internet of Vehicles terminal, thereby completing the update of the location information of the Internet of Vehicles terminal. Then, the network side device, according to the physical location information of the Internet of Vehicles terminal, searches for another Internet of Vehicles terminal that is located from the Internet of Vehicles terminal by a distance less than or equal to a first threshold as the neighboring Internet of Vehicles terminal, and obtains the radio resource occupied by the neighboring Internet of Vehicles terminal, so as to optimize the allocation of the radio resource of the Internet of Vehicles terminal according to the radio resource occupied by the neighboring Internet of Vehicles terminal, such that interference between the radio resource of the Internet of Vehicles terminal and the radio resource of the neighboring Internet of Vehicles terminal can be minimized. Thereby, the present disclosure can improve the effect of V2V/V2X communication for the Internet of Vehicles terminals and can solve the problem of signaling load imbalance of the Internet of Vehicles terminals.

Here, the network side device may, according to the current physical location information of the Internet of Vehicles terminal and the current motion state information of the Internet of Vehicles terminal included in the current physical location information of the Internet of Vehicles terminal, predict a subsequent motion track of the Internet of Vehicles terminal, so as to optimize the allocation of the radio resource of the Internet of Vehicles terminal.

Here, the network side device optimizing the allocation of the radio resource of the Internet of Vehicles terminal according to the radio resource occupied by the neighboring Internet of Vehicles terminal, include: allocating, by the network side device, for the Internet of Vehicles terminal a radio resource that has is in a frequency band different from that of the radio resource occupied by the neighboring Internet of Vehicles terminal, according to the radio resource occupied by the neighboring Internet of Vehicles terminal; if there is no radio resource that has is in a frequency band different from that of the radio resource occupied by the neighboring Internet of Vehicles terminal in the network for the moment, allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has a time domain distance larger than a second threshold, so as to reduce interference between the radio resource allocated for the Internet of Vehicles terminal and the radio resource of the neighboring Internet of Vehicles terminal of the Internet of Vehicles terminal as much as possible.

Here, the radio resource is a resource required for the Internet of Vehicles terminal to perform V2V/V2X communications. Therefore, the network side device can, in addition to optimize the allocation of the radio resource for V2V/V2X communication of the Internet of Vehicles terminal, optimize allocation of radio resources for V2V/V2X communication of other Internet of Vehicles terminals than the said Internet of Vehicles terminal, for example, the neighboring Internet of Vehicles terminal of the said Internet of Vehicles terminal. If the network side device re-allocates a new radio resource for the Internet of Vehicles terminal, the network side device may have to send an RRC connection reconfiguration message to the Internet of Vehicles terminal again, such that the Internet of Vehicles terminal performs radio resource reconfiguration again.

Second Embodiment

Figure 2:
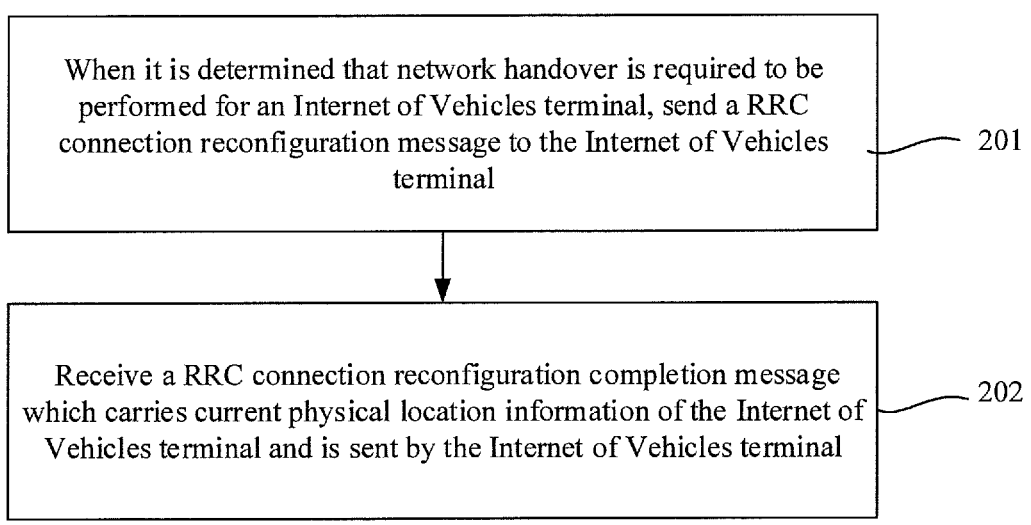
FIG. 2 is a schematic flowchart of a mobility management method according to a second embodiment of the present disclosure.

FIG. 2 is a schematic flowchart of a mobility management method according to an embodiment of the present disclosure, which is applied in a network side device. The method includes the following steps.

In step 201, when it is determined that network handover is required to be performed for an Internet of Vehicles terminal, a RRC connection reconfiguration message is sent to the Internet of Vehicles terminal.

Specifically, when the network side device determines that network handover is required to be performed for the Internet of Vehicles terminal, the network side device sends a RRC connection reconfiguration message to the Internet of Vehicles terminal, such that the Internet of Vehicles terminal performs reconfiguration of a radio resource and the Internet of Vehicles terminal obtains its current physical location information.

Here, the network side device determining that that network handover is required to be performed for the Internet of Vehicles terminal includes the network side device receiving a cell measurement report reported by the Internet of Vehicles terminal, and determining that network handover is required to be performed for the Internet of Vehicles terminal according to the cell measurement report, and/or the network side device detecting that a radio resource is re-allocated to the Internet of Vehicles terminal. For example, when the network side device detects, according to the cell measurement report reported by the Internet of Vehicles terminal, that a signal quality of a neighboring cell of the cell that the Internet of Vehicles terminal is currently located is better than a signal quality of the cell that the Internet of Vehicles terminal is currently located, and the network device can determine that network handover is required to be performed for the Internet of Vehicles terminal.

Here, the network side device includes an eNB, a mobility management device, a gateway, a core network device, or an Internet of Vehicles server, etc., that is connected to the eNB. The RRC connection reconfiguration message sent by the network side device is forwarded to the Internet of Vehicles terminal via the eNB. That is, the network side device sends the message that is to be sent to the Internet of Vehicles terminal to the corresponding Internet of Vehicles terminal via the eNB. Similarly, the message that the Internet of Vehicles terminal needs to send to the network side device is also sent to the corresponding network side device via the eNB. When the network side device is an eNB, the mobility management device may serve as a processing unit in the network side device, and may be configured to determine whether the Internet of Vehicles terminal needs to perform network handover and then optimize allocation of the radio resource for the Internet of Vehicles terminal.

Here, the Internet of Vehicles terminal refers to a terminal implementing V2V/V2X communication depending on an LTE-Uu interface, and/or a PCI interface, and/or a MBMS. The LTE-Uu interface refers to an interface between a UE and an eNB in LTE.

Here, the RRC connection reconfiguration message may further carry mobility management information, configured to instruct the Internet of Vehicles terminal to perform network handover after receiving the RRC reconfiguration message. The RRC connection reconfiguration message also carries information about a transmitting and/or receiving radio resource allocated to the Internet of Vehicles terminal for Internet of Vehicles communication. The transmitting radio resource information refers to a radio resource required for transmitting a message when the Internet of Vehicles terminal performs Internet of Vehicles communication. The receiving radio resource information refers to a radio resource required for receiving a message when the Internet of Vehicles terminal performs Internet of Vehicles communication.

In step 202, a RRC connection reconfiguration completion message which carries current physical location information of the Internet of Vehicles terminal and is sent by the Internet of Vehicles terminal is received.

Specifically, after the Internet of Vehicles terminal completes the reconfiguration of the radio resource according to the RRC connection reconfiguration message sent by the network side device in step 201 and obtains the current physical location information of itself, the Internet of Vehicles terminal ends a RRC connection reconfiguration completion message carrying the current physical location of the Internet of Vehicles terminal to the network side device. The network side device receives the RRC connection reconfiguration completion message that is sent by the Internet of Vehicles terminal and carries the current physical location information of the Internet of Vehicles terminal, and takes the received current physical location information of the Internet of Vehicles terminal as the location information of the Internet of Vehicles terminal, thereby completing the update of the location information of the Internet of Vehicles terminal.

In this embodiment, the current physical location information of the Internet of Vehicles terminal includes at least one of the following information: current global positioning system GPS location information, Beidou satellite positioning location information, pre-allocated physical location number information, location area information, and network-assisted positioning location information of the Internet of Vehicles terminal. The current physical location information of the Internet of Vehicles terminal may also be obtained by other positioning methods in the related art. The pre-allocated physical location number information may be number information defined by the user in advance for different areas, and when an Internet of Vehicles terminal is located in a certain area, the Internet of Vehicles terminal may obtain the physical location number information corresponding to the area.

Here, the current physical location information of the Internet of Vehicles terminal may further carry current motion state information of the Internet of Vehicles terminal. The current motion state information of the Internet of Vehicles terminal includes at least one of the following information: a current running speed, a running direction, an acceleration, a running time, a destination of the Internet of Vehicles terminal.

Further, the method further includes:

determining a neighboring Internet of Vehicles terminal that is located from the Internet of Vehicles terminal by a distance less than or equal to a first threshold according to the current physical location information of the Internet of Vehicles terminal, and obtaining a radio resource occupied by the neighboring Internet of Vehicles terminal; and allocating for the Internet of Vehicles terminal a radio resource that is in a frequency band different from that of the radio resource occupied by the neighboring Internet of Vehicles terminal, according to the radio resource occupied by the neighboring Internet of Vehicles terminal;

or, allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal;

or, allocating for the Internet of Vehicles terminal a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

Here, after receiving the RRC connection reconfiguration completion message that is sent by the Internet of Vehicles terminal and carries the current physical location information of the Internet of Vehicles terminal, the network side device stores the current physical location information of the Internet of Vehicles terminal in the location information corresponding to the Internet of Vehicles terminal, thereby completing the update of the location information of the Internet of Vehicles terminal. Then, the network side device, according to the physical location information of the Internet of Vehicles terminal, searches for another Internet of Vehicles terminal that is located from the Internet of Vehicles terminal by a distance less than or equal to a first threshold as the neighboring Internet of Vehicles terminal, and obtains the radio resource occupied by the neighboring Internet of Vehicles terminal, so as to optimize the allocation of the radio resource of the Internet of Vehicles terminal according to the radio resource occupied by the neighboring Internet of Vehicles terminal, such that interference between the radio resource of the Internet of Vehicles terminal and the radio resource of the neighboring Internet of Vehicles terminal can be minimized. Thereby, the present disclosure can improve the effect of V2V/V2X communication for the Internet of Vehicles terminals and can solve the problem of signaling load imbalance of the Internet of Vehicles terminals.

The network side device may, according to the current physical location information of the Internet of Vehicles terminal and the current motion state information of the Internet of Vehicles terminal included in the current physical location information of the Internet of Vehicles terminal, predict a subsequent motion track of the Internet of Vehicles terminal, so as to optimize the allocation of the radio resource of the Internet of Vehicles terminal.

Here, the network side device optimizing the allocation of the radio resource of the Internet of Vehicles terminal according to the radio resource occupied by the neighboring Internet of Vehicles terminal, include: allocating, by the network side device, for the Internet of Vehicles terminal a radio resource that is in a frequency band different from that of the radio resource occupied by the neighboring Internet of Vehicles terminal, according to the radio resource occupied by the neighboring Internet of Vehicles terminal; if there is no radio resource that is in a frequency band different from that of the radio resource occupied by the neighboring Internet of Vehicles terminal, allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has a time domain distance larger than a second threshold, so as to reduce interference between the radio resource allocated for the Internet of Vehicles terminal and the radio resource of the neighboring Internet of Vehicles terminal of the Internet of Vehicles terminal as much as possible.

Here, the radio resource is a resource required for the Internet of Vehicles terminal to perform V2V/V2X communications. Therefore, the network side device can, in addition to optimize the allocation of the radio resource for V2V/V2X communication of the Internet of Vehicles terminal, optimize allocation of radio resources for V2V/V2X communication of other Internet of Vehicles terminals than the said Internet of Vehicles terminal, for example, the neighboring Internet of Vehicles terminal of the said Internet of Vehicles terminal. If the network side device re-allocates a new radio resource for the Internet of Vehicles terminal, the network side device may have to send an RRC connection reconfiguration message to the Internet of Vehicles terminal again, such that the Internet of Vehicles terminal performs radio resource reconfiguration again.

Third Embodiment

Figure 3:
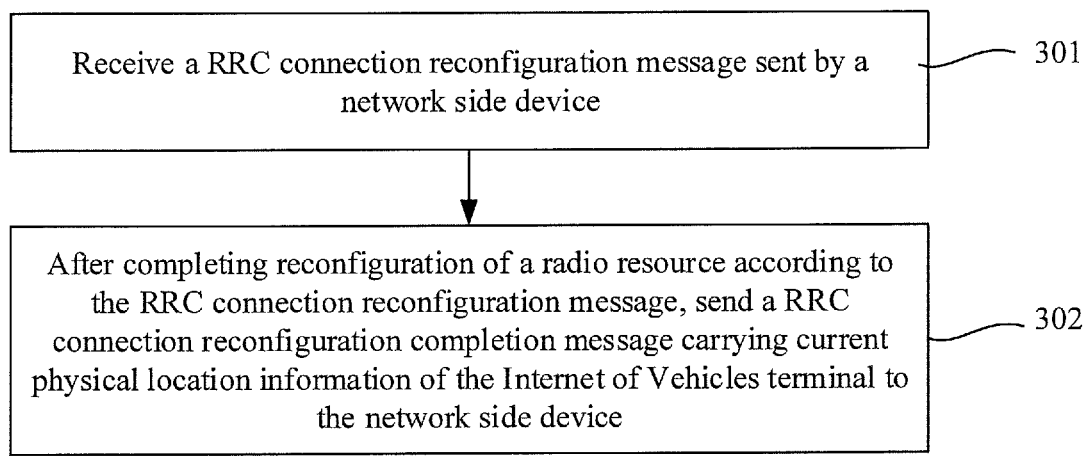
FIG. 3 is a schematic flowchart of a mobility management method according to a third embodiment of the present disclosure.

FIG. 3 is a schematic flowchart of a mobility management method according to a third embodiment of the present disclosure, which is applied in an Internet of Vehicles terminal. The method includes the following steps.

In step 301, a RRC connection reconfiguration message sent by a network side device is received.

Specifically, the Internet of Vehicles terminal receives a RRC connection reconfiguration message sent by the network side device when the network side device determines that network handover is required to be performed for the Internet of Vehicles terminal, performs reconfiguration of a radio resource according to the RRC connection reconfiguration message and obtains current physical location information of itself.

Further, before step 301, the method further includes: reporting a cell measurement report to the network side.

Here, the cell measurement report reported by the Internet of Vehicles terminal to the network side device is used to evaluate a signal quality of the cell in which the Internet of Vehicles terminal is currently located and/or a neighboring cell of the current cell, such that the network side device determines whether network handover is required to be performed for an Internet of Vehicles terminal. For example, when the network side device detects, according to the cell measurement report reported by the Internet of Vehicles terminal, that a signal quality of a neighboring cell of the cell that the Internet of Vehicles terminal is currently located is better than a signal quality of the cell that the Internet of Vehicles terminal is currently located, and the network device can determine that network handover is required to be performed for the Internet of Vehicles terminal.

Here, the network side device includes an eNB, a mobility management device connected to the eNB, a gateway, a core network device, and an Internet of Vehicles server, etc. The RRC connection reconfiguration message sent by the network side device is forwarded to the Internet of Vehicles terminal via the eNB. That is, the network side device sends the message that is to be sent to the Internet of Vehicles terminal to the corresponding Internet of Vehicles terminal via the eNB. Similarly, the message that the Internet of Vehicles terminal needs to send to the network side device is also sent to the corresponding network side via the eNB. The Internet of Vehicles terminal refers to a terminal implementing V2V/V2X communications depending on an LTE-Uu interface, and/or a PCI interface, and/or a MBMS. The LTE-Uu interface refers to an interface between a UE and an eNB in LTE.

Here, the RRC connection reconfiguration message may further carry mobility management information, configured to instruct the Internet of Vehicles terminal to perform network handover after receiving the RRC reconfiguration message. The RRC connection reconfiguration message also carries information about a transmitting and/or receiving radio resource allocated to the Internet of Vehicles terminal for Internet of Vehicles communication. The transmitting radio resource information refers to a radio resource required for transmitting a message when the Internet of Vehicles terminal performs Internet of Vehicles communication. The receiving radio resource information refers to a radio resource required for receiving a message when the Internet of Vehicles terminal performs Internet of Vehicles communication.

In step 302, after completing reconfiguration of a radio resource according to the RRC connection reconfiguration message, a RRC connection reconfiguration completion message carrying current physical location information of the Internet of Vehicles terminal is sent to the network side device.

Specifically, after the Internet of Vehicles terminal completes the reconfiguration of the radio resource according to the RRC connection reconfiguration message sent by the network side device in step 301 and obtains the current physical location information of the Internet of Vehicles terminal itself, the Internet of Vehicles terminal sends to the network side device a RRC connection reconfiguration completion message carrying the current physical location information of the Internet of Vehicles terminal, such that the network side device takes the received current physical location information of the Internet of Vehicles terminal as location information of the Internet of Vehicles terminal, that is, the network side device may complete update of the location information of the Internet of Vehicles terminal.

In this embodiment, the current physical location information of the Internet of Vehicles terminal includes at least one of the following information: current global positioning system GPS location information, Beidou satellite positioning location information, pre-allocated physical location number information, location area information, and network-assisted positioning location information of the Internet of Vehicles terminal. The current physical location information of the Internet of Vehicles terminal may also be obtained by other location positioning methods in the related art. The pre-allocated physical location number information may be number information defined by the user in advance for different areas, and when an Internet of Vehicles terminal is located in a certain area, the Internet of Vehicles terminal may obtain the physical location number information corresponding to the area.

Here, the current physical location information of the Internet of Vehicles terminal may further carry current motion state information of the Internet of Vehicles terminal. The current motion state information of the Internet of Vehicles terminal includes at least one of the following information: a current running speed, a running direction, an acceleration, a running time, a destination of the Internet of Vehicles terminal.

Fourth Embodiment

Figure 4:
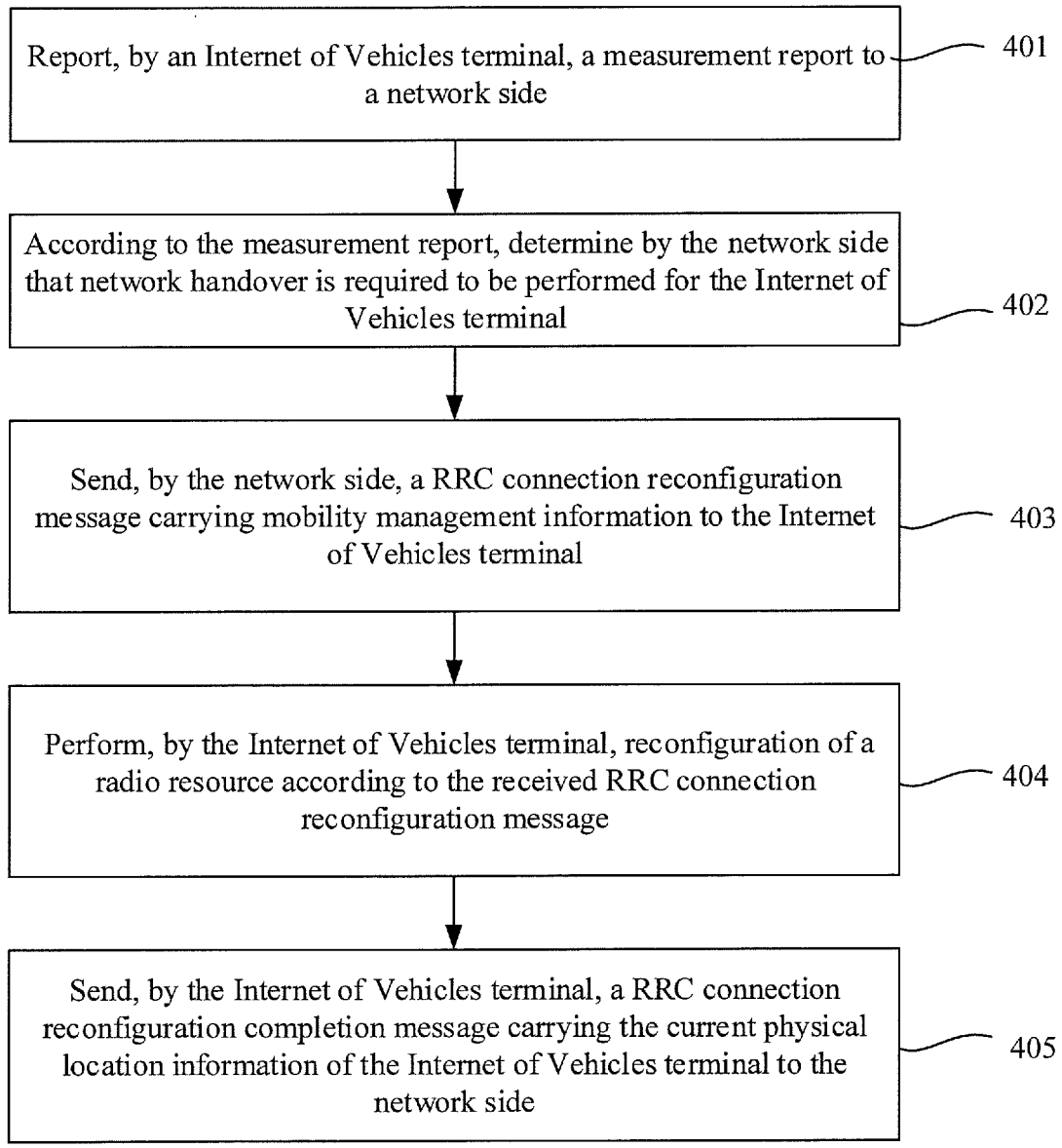
FIG. 4 is a schematic flowchart of a mobility management method according to a fourth embodiment of the present disclosure.

The present disclosure will be further described with reference to a specific example. FIG. 4 is a schematic flowchart of a mobility management method according to an embodiment of the present disclosure. The method includes the following steps.

In step 401, an Internet of Vehicles terminal reports a measurement report to a network side.

Specifically, the Internet of Vehicles terminal reports to the network side a measurement report composed of measurement information of the current cell where the Internet of Vehicles terminal is located and a neighboring cell.

In step 402, the network side detects, according to the measurement report, that network handover is required to be performed for the Internet of Vehicles terminal.

Specifically, the network side detects that that network handover is required to be performed for the Internet of Vehicles terminal according to the measurement report reported by the Internet of Vehicles terminal in step 401, and proceeds to step 403.

Here, the measurement report reported by the Internet of Vehicles terminal is generally received by an eNB, and then may be forwarded by the eNB to a mobility management device, a gateway, a core network device, and the like connected to the eNB.

In step 403, the network side sends a RRC connection reconfiguration message carrying mobility management information to the Internet of Vehicles terminal.

Specifically, when the network side detects that network handover is required to be performed for the Internet of Vehicles terminal in step 402, the network side sends the RRC connection reconfiguration message carrying the mobility management information to the Internet of Vehicles terminal.

Here, the RRC Connection Reconfiguration message is sent by the eNB to the Internet of Vehicles terminal.

In step 404, the Internet of Vehicles terminal performs reconfiguration of a radio resource according to the received RRC connection reconfiguration message.

Specifically, the Internet of Vehicles terminal receives the RRC connection reconfiguration message carrying the mobility management information sent by the network side in step 403, performs radio resource reconfiguration according to the received RRC connection reconfiguration message to complete the network handover, and obtains current physical location information of the Internet of Vehicles terminal.

In step 405, the Internet of Vehicles terminal sends a RRC connection reconfiguration completion message carrying the current physical location information of the Internet of Vehicles terminal to the network side.

Specifically, after completing the radio resource reconfiguration in step 404, the Internet of Vehicles terminal sends a RRC connection reconfiguration completion message carrying the current physical location information of the Internet of Vehicles terminal to the network side.

Here, after receiving the RRC connection reconfiguration completion message sent by the Internet of Vehicles terminal, the network side updates the location information of the Internet of Vehicles terminal according to the current physical location information of the Internet of Vehicles terminal included in the RRC connection reconfiguration completion message and optimizes allocation of the radio resource.

Here, the RRC connection reconfiguration completion message that is sent by the Internet of Vehicles terminal and carries the current physical location information of the Internet of Vehicles terminal is generally received by the eNB, and after the eNB processes the received RRC connection reconfiguration completion message, the eNB may send the current physical location information of the Internet of Vehicles terminal to a mobility management device or an Internet of Vehicles server, such that the network side updates the location information of the Internet of Vehicles terminal and optimizes allocation of radio resources.

Fifth Embodiment

Figure 5:
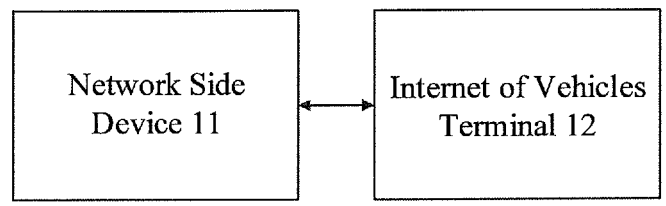
FIG. 5 is a schematic block diagram of a mobility management system according to a fifth embodiment of the present disclosure.

FIG. 5 is a schematic block diagram of a mobility management system according to a fifth embodiment of the present disclosure. The system includes: a network side device 11 and an Internet of Vehicles terminal 12.

The network side device 11 is configured to, when determining that network handover is required to be performed for the Internet of Vehicles terminal 12, send a RRC connection reconfiguration message to the Internet of Vehicles terminal 12.

The Internet of Vehicles terminal 12 is configured to receive the RRC connection reconfiguration message sent by the network side device 11, and after completing reconfiguration of a radio resource according to the RRC connection reconfiguration message, send to the network side device 11 a RRC connection reconfiguration completion message carrying current physical location information of the Internet of Vehicles terminal 12.

The network side device 11 is further configured to receive the RRC connection reconfiguration completion message which carries the current physical location information of the Internet of Vehicles terminal 12 and is sent by the Internet of Vehicles terminal 12.

The network side device 11 is specifically configured to, when determining that network handover is required to be performed for the Internet of Vehicles terminal 12, send a RRC connection reconfiguration message to the Internet of Vehicles terminal 12, such that the Internet of Vehicles terminal 12 performs reconfiguration of a radio resource and the Internet of Vehicles terminal 12 obtains its current physical location information.

Here, the network side device 11 determining that that network handover is required to be performed for the Internet of Vehicles terminal includes the network side device 11 receiving a cell measurement report reported by the Internet of Vehicles terminal 12, and determining that network handover is required to be performed for the Internet of Vehicles terminal 12 according to the cell measurement report, and/or the network side device 11 detecting that a radio resource is re-allocated to the Internet of Vehicles terminal 12. For example, when the network side device 11 detects, according to the cell measurement report reported by the Internet of Vehicles terminal 12, that a signal quality of a neighboring cell of the cell that the Internet of Vehicles terminal 12 is currently located is better than a signal quality of the cell that the Internet of Vehicles terminal 12 is currently located, the network device 11 can determine that network handover is required to be performed for the Internet of Vehicles terminal 12.

Here, the network side device 11 includes an eNB, a mobility management device, a gateway, a core network device, and/or an Internet of Vehicles server, etc., that is connected to the eNB. The RRC connection reconfiguration message sent by the network side device 11 is forwarded to the Internet of Vehicles terminal 12 via the eNB. That is, the network side device 11 sends the message that is to be sent to the Internet of Vehicles terminal 12 to the corresponding Internet of Vehicles terminal 12 via the eNB. Similarly, the message that the Internet of Vehicles terminal 12 needs to send to the network side device 11 is also sent to the corresponding network side device 11 via the eNB.

Here, the Internet of Vehicles terminal 12 refers to a terminal implementing V2V/V2X communications depending on an LTE-Uu interface, and/or a PCI interface, and/or a MBMS, such as an on-board terminal. The LTE-Uu interface refers to an interface between a UE and an eNB in LTE.

Here, the RRC connection reconfiguration message may further carry mobility management information, configured to instruct the Internet of Vehicles terminal 12 to perform network handover after receiving the RRC reconfiguration message. The RRC connection reconfiguration message also carries information about a transmitting and/or receiving radio resource allocated to the Internet of Vehicles terminal 12 for Internet of Vehicles communication. The transmitting radio resource information refers to a radio resource required for transmitting a message when the Internet of Vehicles terminal 12 performs Internet of Vehicles communication. The receiving radio resource information refers to a radio resource required for receiving a message when the Internet of Vehicles terminal 12 performs Internet of Vehicles communication.

The Internet of Vehicles terminal 12 is specifically configured to receive the RRC connection reconfiguration message sent by the network side device 11, and after completing reconfiguration of a radio resource according to the RRC connection reconfiguration message and obtaining its current physical location information, send to the network side device 11 a RRC connection reconfiguration completion message carrying the current physical location information of the Internet of Vehicles terminal 12, such that the network side device 11 takes the received current physical location information of the Internet of Vehicles terminal 12 as location information of the Internet of Vehicles terminal 12, that is, the network side device 11 may complete update of the location information of the Internet of Vehicles terminal 12.

In this embodiment, the current physical location information of the Internet of Vehicles terminal 12 includes at least one of the following information: current global positioning system GPS location information, Beidou satellite positioning location information, pre-allocated physical location number information, location area information, and network-assisted positioning location information of the Internet of Vehicles terminal 12. The current physical location information of the Internet of Vehicles terminal 12 may also be obtained by other location positioning methods in the related art. The pre-allocated physical location number information may be number information defined by the user in advance for different areas, and when an Internet of Vehicles terminal is located in a certain area, the Internet of Vehicles terminal may obtain the physical location number information corresponding to the area.

Here, the current physical location information of the Internet of Vehicles terminal 12 may further carry current motion state information of the Internet of Vehicles terminal 12. The current motion state information of the Internet of Vehicles terminal 12 includes at least one of the following information: a current running speed, a running direction, an acceleration, a running time, a destination of the Internet of Vehicles terminal 12.

The network side device 11 is specifically configured to receive a RRC connection reconfiguration completion message that is sent by the Internet of Vehicles terminal 12 and carries current physical location information of the Internet of Vehicles terminal 12, take the current physical location information of the Internet of Vehicles terminal 12 as the location information of the Internet of Vehicles terminal 12, that is, to complete the location information of the Internet of Vehicles terminal 12.

Further, the network side device 11 is further configured to:

determine a neighboring Internet of Vehicles terminal that is located from the Internet of Vehicles terminal 12 by a distance less than or equal to a first threshold according to the current physical location information of the Internet of Vehicles terminal 12, and obtain a radio resource occupied by the neighboring Internet of Vehicles terminal; and allocate for the Internet of Vehicles terminal 12 a radio resource that is in a frequency band different from that of the radio resource occupied by the neighboring Internet of Vehicles terminal, according to the radio resource occupied by the neighboring Internet of Vehicles terminal;

or, allocate for the Internet of Vehicles terminal 12 a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal;

or, allocate for the Internet of Vehicles terminal 12 a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

Here, after receiving the RRC connection reconfiguration completion message that is sent by the Internet of Vehicles terminal 12 and carries the current physical location information of the Internet of Vehicles terminal 12, the network side device 11 stores the current physical location information of the Internet of Vehicles terminal 12 in the location information corresponding to the Internet of Vehicles terminal 12, thereby completing the update of the location information of the Internet of Vehicles terminal 12. Then, the network side device 11, according to the physical location information of the Internet of Vehicles terminal 12, searches for another Internet of Vehicles terminal that is located from the Internet of Vehicles terminal 12 by a distance less than or equal to a first threshold as the neighboring Internet of Vehicles terminal, and obtains the radio resource occupied by the neighboring Internet of Vehicles terminal, so as to optimize the allocation of the radio resource of the Internet of Vehicles terminal 12 according to the radio resource occupied by the neighboring Internet of Vehicles terminal, such that interference between the radio resource of the Internet of Vehicles terminal 12 and the radio resource of the neighboring Internet of Vehicles terminal can be minimized. Thereby, the present disclosure can improve the effect of V2V/V2X communication for the Internet of Vehicles terminals and can solve the problem of signaling load imbalance of the Internet of Vehicles terminals.

Here, the network side device 11 may, according to the current physical location information of the Internet of Vehicles terminal 12 and the current motion state information of the Internet of Vehicles terminal 12 included in the current physical location information of the Internet of Vehicles terminal 12, predict a subsequent motion track of the Internet of Vehicles terminal 12, so as to optimize the allocation of the radio resource of the Internet of Vehicles terminal 12.

Here, the network side device 11 optimizing the allocation of the radio resource of the Internet of Vehicles terminal 12 according to the radio resource occupied by the neighboring Internet of Vehicles terminal, include: allocating, by the network side device 11, for the Internet of Vehicles terminal 12 a radio resource that is in a frequency band different from that of the radio resource occupied by the neighboring Internet of Vehicles terminal, according to the radio resource occupied by the neighboring Internet of Vehicles terminal; if there is no a radio resource that is in a frequency band different from that of the radio resource occupied by the neighboring Internet of Vehicles terminal in the network for the moment, allocating for the Internet of Vehicles terminal 12 a radio resource that is in the same frequency band as that of the radio resource occupied by the neighboring Internet of Vehicles terminal and has the largest distance to the radio resource occupied by the neighboring Internet of Vehicles terminal; or allocating for the Internet of Vehicles terminal 12 a radio resource that is in the same frequency band as that of the radio resource occupied by the neighboring Internet of Vehicles terminal and has a time domain distance larger than a second threshold, so as to reduce interference between the radio resource allocated for the Internet of Vehicles terminal 12 and the radio resource of the neighboring Internet of Vehicles terminal of the Internet of Vehicles terminal as much as possible.

Here, the radio resource is a resource required for the Internet of Vehicles terminal to perform V2V/V2X communication. Therefore, the network side device 11 can, in addition to optimize the allocation of the radio resource for V2V/V2X communication of the Internet of Vehicles terminal 12, optimize allocation of radio resources for V2V/V2X communication of other Internet of Vehicles terminals than the said Internet of Vehicles terminal 12, for example, the neighboring Internet of Vehicles terminal of the said Internet of Vehicles terminal. If the network side device 11 re-allocates a new radio resource for the Internet of Vehicles terminal 12, the network side device 11 may have to send an RRC connection reconfiguration message to the Internet of Vehicles terminal 12 again, such that the Internet of Vehicles terminal 12 performs radio resource reconfiguration again.

Sixth Embodiment

Figure 6:
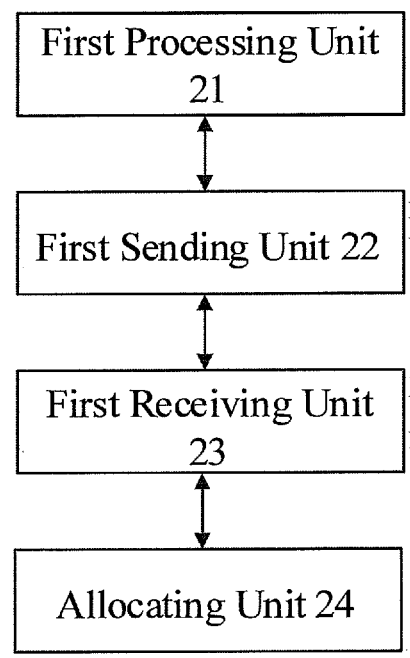
FIG. 6 is a schematic block diagram of a network side device according to a sixth embodiment of the present disclosure.

FIG. 6 is a schematic block diagram of a network side device according to a sixth embodiment of the present disclosure, and the network side device includes: a first processing unit 21, a first sending unit 22 and a first receiving unit 23.

The first sending unit 22 is configured to, when the first processing unit 21 determines that network handover is required to be performed for an Internet of Vehicles terminal, send a RRC connection reconfiguration message to the Internet of Vehicles terminal.

The first receiving unit 23 is configured to receive a RRC connection reconfiguration completion message which carries current physical location information of the Internet of Vehicles terminal and is sent by the Internet of Vehicles terminal.

The first sending unit 22 is specifically configured to: when the first processing unit 21 determines that network handover is required to be performed for an Internet of Vehicles terminal, send a RRC connection reconfiguration message to the Internet of Vehicles terminal, such that the Internet of Vehicles terminal performs reconfiguration of a radio resource and the Internet of Vehicles terminal obtains its current physical location information.

Here, the first processing unit 21 is specifically configured to: according to the cell measurement report reported by the Internet of Vehicles terminal received by the first receiving unit 23, determine whether network handover is required to be performed for an Internet of Vehicles terminal, if it is so, determine that network handover is required to be performed for an Internet of Vehicles terminal, and/or, detect whether a radio resource is re-allocated to the Internet of Vehicles terminal, if so, determine that network handover is required to be performed for an Internet of Vehicles terminal. For example, when the first processing unit 21 detects, according to the cell measurement report reported by the Internet of Vehicles terminal, that a signal quality of a neighboring cell of the cell that the Internet of Vehicles terminal is currently located is better than a signal quality of the cell that the Internet of Vehicles terminal is currently located, and the network device can determine that network handover is required to be performed for the Internet of Vehicles terminal.

Here, when the network side device is an eNB, the mobility management device can serve as a processing unit of the network side device, that is, as the first processing unit 21.

Here, the RRC connection reconfiguration message sent by the first sending unit 22 is forwarded to the Internet of Vehicles terminal via the eNB. That is, the first sending unit 22 sends the message that is to be sent to the Internet of Vehicles terminal to the corresponding Internet of Vehicles terminal via the eNB. Similarly, the message that the Internet of Vehicles terminal needs to send to the first receiving unit 23 is also sent to the first receiving unit 23 via the eNB. The Internet of Vehicles terminal refers to a terminal implementing V2V/V2X communication depending on an LTE-Uu interface, and/or a PCI interface, and/or a MBMS. The LTE-Uu interface refers to an interface between a UE and an eNB in LTE.

Here, the RRC connection reconfiguration message may further carry mobility management information, configured to instruct the Internet of Vehicles terminal to perform network handover after receiving the RRC reconfiguration message. The RRC connection reconfiguration message also carries information about a transmitting and/or receiving radio resource allocated to the Internet of Vehicles terminal for Internet of Vehicles communication. The transmitting radio resource information refers to a radio resource required for transmitting a message when the Internet of Vehicles terminal performs Internet of Vehicles communication. The receiving radio resource information refers to a radio resource required for receiving a message when the Internet of Vehicles terminal performs Internet of Vehicles communication.

After the Internet of Vehicles terminal completes the reconfiguration according to the RRC connection reconfiguration message sent by the first sending unit 22 to implement the network handover and obtains current physical location information of itself, and sends to the first receiving unit 23 a RRC connection reconfiguration completion message carrying the current physical location information of the Internet of Vehicles terminal, the first receiving unit 23 receives the RRC connection reconfiguration completion message which carries the current physical location information of the Internet of Vehicles terminal and is sent by the Internet of Vehicles terminal, takes the received current physical location information of the Internet of Vehicles terminal as location information of the Internet of Vehicles terminal, that is, updates the location information of the Internet of Vehicles terminal.

In this embodiment, the current physical location information of the Internet of Vehicles terminal includes at least one of the following information: current global positioning system GPS location information, Beidou satellite positioning location information, pre-allocated physical location number information, location area information, and network-assisted positioning location information of the Internet of Vehicles terminal. The current physical location information of the Internet of Vehicles terminal may also be obtained by other location positioning methods in the related art. The pre-allocated physical location number information may be number information defined by the user in advance for different areas, and when an Internet of Vehicles terminal is located in a certain area, the Internet of Vehicles terminal may obtain the physical location number information corresponding to the area.

Here, the current physical location information of the Internet of Vehicles terminal may further carry current motion state information of the Internet of Vehicles terminal. The current motion state information of the Internet of Vehicles terminal may include at least one of the following information: a current running speed, a running direction, an acceleration, a running time, a destination of the Internet of Vehicles terminal.

Further, the network side device further includes an allocating unit 24.

The first processing unit 21 is further configured to determine a neighboring Internet of Vehicles terminal that is located from the Internet of Vehicles terminal by a distance less than or equal to a first threshold according to the current physical location information of the Internet of Vehicles terminal, and obtain a radio resource occupied by the neighboring Internet of Vehicles terminal.

The allocating unit 24 is configured to allocate for the Internet of Vehicles terminal a radio resource that is in a frequency band different from that of the radio resource occupied by the neighboring Internet of Vehicles terminal, according to the radio resource occupied by the neighboring Internet of Vehicles terminal; or, a radio resource that is in the same frequency band as that of the radio resource occupied by the neighboring Internet of Vehicles terminal and has the largest distance to the radio resource occupied by the neighboring Internet of Vehicles terminal, according to the radio resource occupied by the neighboring Internet of Vehicles terminal; or, allocate for the Internet of Vehicles terminal a radio resource that is in the same frequency band as that of the radio resource occupied by the neighboring Internet of Vehicles terminal and has a time domain distance larger than a second threshold, according to the radio resource occupied by the neighboring Internet of Vehicles terminal.

Here, after the first receiving unit 23 receives the RRC connection reconfiguration completion message that is sent by the Internet of Vehicles terminal and carries the current physical location information of the Internet of Vehicles terminal, the current physical location information of the Internet of Vehicles terminal is stored in the location information corresponding to the Internet of Vehicles terminal, thereby the update of the location information of the Internet of Vehicles terminal is completed. Then, the first processing unit 21, according to the physical location information of the Internet of Vehicles terminal, searches for another Internet of Vehicles terminal that is located from the Internet of Vehicles terminal by a distance less than or equal to a first threshold as the neighboring Internet of Vehicles terminal, and obtains the radio resource occupied by the neighboring Internet of Vehicles terminal, such that the allocating unit 24 optimizes the allocation of the radio resource of the Internet of Vehicles terminal according to the radio resource occupied by the neighboring Internet of Vehicles terminal, such that interference between the radio resource of the Internet of Vehicles terminal and the radio resource of the neighboring Internet of Vehicles terminal can be minimized. Thereby, the present disclosure can improve the effect of V2V/V2X communication for the Internet of Vehicles terminals and can solve the problem of signaling load imbalance of the Internet of Vehicles terminals.

Here, the allocating unit 24 may, according to the current physical location information of the Internet of Vehicles terminal and the current motion state information of the Internet of Vehicles terminal included in the current physical location information of the Internet of Vehicles terminal, predict a subsequent motion track of the Internet of Vehicles terminal, so as to optimize the allocation of the radio resource of the Internet of Vehicles terminal.

Here, the allocating unit 24 optimizing the allocation of the radio resource of the Internet of Vehicles terminal according to the radio resource occupied by the neighboring Internet of Vehicles terminal, include: allocating for the Internet of Vehicles terminal a radio resource that is in a frequency band different from that of the radio resource occupied by the neighboring Internet of Vehicles terminal, according to the radio resource occupied by the neighboring Internet of Vehicles terminal; if there is no a radio resource that is in a frequency band different from that of the radio resource occupied by the neighboring Internet of Vehicles terminal, according to the radio resource occupied by the neighboring Internet of Vehicles terminal in the network for the moment, allocating for the Internet of Vehicles terminal a radio resource that is in the same frequency band as that of the radio resource occupied by the neighboring Internet of Vehicles terminal and has the largest distance to the radio resource occupied by the neighboring Internet of Vehicles terminal; or allocating for the Internet of Vehicles terminal a radio resource that is in the same frequency band as that of the radio resource occupied by the neighboring Internet of Vehicles terminal and has a time domain distance larger than a second threshold, so as to reduce interference between the radio resource allocated for the Internet of Vehicles terminal and the radio resource of the neighboring Internet of Vehicles terminal of the Internet of Vehicles terminal as much as possible.

Here, the radio resource is a resource required for the Internet of Vehicles terminal to perform V2V/V2X communication. Therefore, the allocating unit 24 can, in addition to optimize the allocation of the radio resource for V2V/V2X communication of the Internet of Vehicles terminal, optimize allocation of radio resources for V2V/V2X communication of other Internet of Vehicles terminals than the said Internet of Vehicles terminal, for example, the neighboring Internet of Vehicles terminal of the said Internet of Vehicles terminal. If the allocating unit 24 re-allocates a new radio resource for the Internet of Vehicles terminal, the first sending unit 22 may send an RRC connection reconfiguration message to the Internet of Vehicles terminal again, such that the Internet of Vehicles terminal performs radio resource reconfiguration again.

In a practical application, the first sending unit 22 and the first receiving unit 23 each can be implemented by a data interface, an antenna system, and the like disposed on the network side device. The first processing unit 21, the allocating unit 24, and an optimizing unit 25 each can be implemented by a Central Processing Unit (CPU), a Microprocessor Unit (MPU), a Digital Signal Processor (DSP), or a Field Programmable Gate Array (FPGA) and the like disposed on the network side device.

Seventh Embodiment

Figure 7:
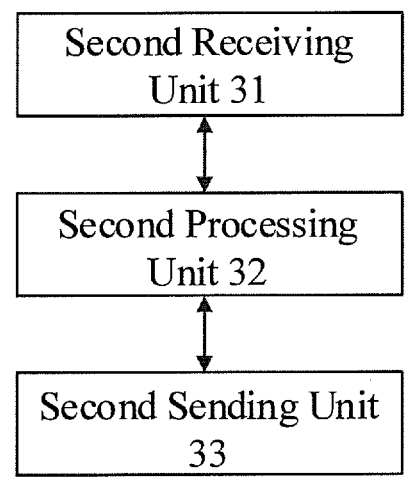
FIG. 7 is a schematic block diagram of an Internet of Vehicles terminal according to a seventh embodiment of the present disclosure.

FIG. 7 is a schematic block diagram of an Internet of Vehicles terminal according to a seventh embodiment of the present disclosure. The Internet of Vehicles terminal includes: a second receiving unit 31, a second processing unit 32 and a second sending unit 33.

The second receiving unit 31 is configured to receive a RRC connection reconfiguration message sent by a network side device.

The second sending unit 33 is configured to, after the second processing unit 32 completes reconfiguration of a radio resource according to the RRC connection reconfiguration message received by the second receiving unit 31, send a RRC connection reconfiguration completion message carrying current physical location information of the Internet of Vehicles terminal to the network side device.

The second receiving unit 31 is specifically configured to receive the RRC connection reconfiguration message sent by the network side device when the network side device determines that network handover is required to be performed for the Internet of Vehicles terminal, such that the second processing unit 32 performs reconfiguration of a radio resource according to the RRC connection reconfiguration message and obtains current physical location information of itself.

Further, the second sending unit 33 is further configured to: report a cell measurement report to the network side.

Here, the cell measurement report reported by the second sending unit 33 to the network side device is used to evaluate a signal quality of the cell in which the Internet of Vehicles terminal is currently located and/or a neighboring cell of the current cell, such that the network side device determines whether network handover is required to be performed for an Internet of Vehicles terminal. For example, when the network side device detects, according to the cell measurement report reported by the second sending unit 33, that a signal quality of a neighboring cell of the cell that the Internet of Vehicles terminal is currently located is better than a signal quality of the cell that the Internet of Vehicles terminal is currently located, and the network device can determine that network handover is required to be performed for the Internet of Vehicles terminal. In addition, the network side device may determine that network handover is required to be performed for the Internet of Vehicles terminal since the network side device detects that a radio resource is re-allocated to the Internet of Vehicles terminal.

Here, the network side device includes an eNB, a mobility management device a gateway, a core network device, and/or an Internet of Vehicles server, etc., that is connected to the eNB. The RRC connection reconfiguration message sent by the network side device is forwarded to the second receiving unit 31 via the eNB. That is, the network side device sends the message that is to be sent to the second receiving unit 31 to the corresponding second receiving unit 31 via the eNB. Similarly, the message that the second sending unit 33 needs to send to the network side device is also sent to the corresponding network side device via the eNB.

Here, the RRC connection reconfiguration message may further carry mobility management information, configured to instruct the Internet of Vehicles terminal to perform network handover after receiving the RRC reconfiguration message. The RRC connection reconfiguration message also carries information about a transmitting and/or receiving radio resource allocated to the Internet of Vehicles terminal for Internet of Vehicles communication. The transmitting radio resource information refers to a radio resource required for transmitting a message when the Internet of Vehicles terminal performs Internet of Vehicles communication. The receiving radio resource information refers to a radio resource required for receiving a message when the Internet of Vehicles terminal performs Internet of Vehicles communication.

The second sending unit 33 is specifically configured to, after the second processing unit 22 completes reconfiguration of a radio resource and obtains current physical location information of the Internet of Vehicles terminal according to the RRC connection reconfiguration message received by the second receiving unit 31, send to the network side device a RRC connection reconfiguration completion message carrying the current physical location information of the Internet of Vehicles terminal, such that the network side device takes the received current physical location information of the Internet of Vehicles terminal as location information of the Internet of Vehicles terminal, that is, the network side device may complete update of the location information of the Internet of Vehicles terminal.

In this embodiment, the current physical location information of the Internet of Vehicles terminal includes at least one of the following information: current global positioning system GPS location information, Beidou satellite positioning location information, pre-allocated physical location number information, location area information, and network-assisted positioning location information of the Internet of Vehicles terminal. The current physical location information of the Internet of Vehicles terminal may also be obtained by other location positioning methods in the related art. The pre-allocated physical location number information may be number information defined by the user in advance for different areas, and when an Internet of Vehicles terminal is located in a certain area, the Internet of Vehicles terminal may obtain the physical location number information corresponding to the area.

Here, the current physical location information of the Internet of Vehicles terminal may further carry current motion state information of the Internet of Vehicles terminal. The current motion state information of the Internet of Vehicles terminal includes at least one of the following information: a current running speed, a running direction, an acceleration, a running time, a destination of the Internet of Vehicles terminal. The network side device may, according to the current physical location information of the Internet of Vehicles terminal and the current motion state information of the Internet of Vehicles terminal included in the current physical location information of the Internet of Vehicles terminal, predict a subsequent motion track of the Internet of Vehicles terminal, so as to optimize the allocation of the radio resource of the Internet of Vehicles terminal.

In practical application, the second receiving unit 31 and the second transmitting unit 33 each can be implemented by a data interface, an antenna interface, and the like disposed on the Internet of Vehicles terminal. The second processing unit 32 may be implemented by a Central Processing Unit (CPU), a Microprocessor (MPU), a Digital Signal Processor (DSP), or a Field Programmable Gate Array (FPGA) and the like disposed on the Internet of Vehicles terminal.

The above is only exemplary embodiments of the present disclosure and the exemplary embodiments are not intended to limit the scope of the present disclosure. Any modifications, equivalent substitutions and improvements made within the spirit and scope of the present disclosure are included in the scope of the present disclosure.

INDUSTRIAL APPLICABILITY

The present disclosure is applicable to the field of Internet of Vehicles technology, so as to enable the location information of the Internet of Vehicles terminal to be updated in time, thereby solving the problem in the related art that the location information of the Internet of Vehicles terminal cannot be updated in time; and, to optimize the allocation of the Internet of Vehicles terminal. The present disclosure can improve the effect of V2V/V2X communication on the Internet of Vehicles terminal, promote the load balancing of the signaling of the Internet of Vehicles terminals, thereby solving the problem of imbalance of signaling load on the Internet of Vehicles terminal.

What is claimed is:

1. A mobility management method, comprising:
    sending, by a network side device, an RRC connection reconfiguration message to an Internet of Vehicles terminal when determining that network handover is required to be performed for the Internet of Vehicles terminal; and
    receiving, by the Internet of Vehicles terminal, the RRC connection reconfiguration message sent by the network side device, and after completing reconfiguration of a radio resource according to the RRC connection reconfiguration message, sending to the network side device a RRC connection reconfiguration completion message carrying current physical location information of the Internet of Vehicles terminal,
    determining, by the network side device, neighboring Internet of Vehicles terminals that are located from the Internet of Vehicles terminal by a distance less than or equal to a first threshold according to the current physical location information of the Internet of Vehicles terminal, and obtaining radio resources occupied by neighboring Internet of Vehicles terminals, respectively;
    according to the radio resources occupied by the neighboring Internet of Vehicles terminals, the network side device performs one of the following operations:
        allocating for the Internet of Vehicles terminal a radio resource that is in the same frequency band as that of a radio resource occupied by one of the neighboring Internet of Vehicles terminals having a largest distance to the Internet of Vehicles terminal; and
        allocating for the Internet of Vehicles terminal a radio resource that is in the same frequency band as that of the radio resource occupied by one of the neighboring Internet of Vehicles terminals having a time domain distance to the Internet of Vehicles terminal larger than a second threshold.

2. The method of claim 1, wherein the RRC connection reconfiguration message carries mobility management information.

3. The method according to claim 1, wherein the RRC connection reconfiguration message carries information about a transmitting and/or receiving radio resource allocated to the Internet of Vehicles terminal for Internet of Vehicles communication.

4. The method according to claim 1, further comprising:
    reporting, by the Internet of Vehicles terminal, a cell measurement report to the network side device.

5. The method according to claim 4, wherein the network side device determining that network handover is required to be performed for the Internet of Vehicles terminal comprises:
    determining that network handover is required to be performed for the Internet of Vehicles terminal according to the received cell measurement report reported by the Internet of Vehicles terminal, and/or
    detecting that a radio resource is re-allocated to the Internet of Vehicles terminal.

6. A mobility management method, which is applied to a network side device, wherein the method comprises:
    sending a radio resource control RRC connection reconfiguration message to an Internet of Vehicles terminal when determining that network handover is required to be performed for the Internet of Vehicles terminal; and
    receiving an RRC connection reconfiguration completion message which carries current physical location information of the Internet of Vehicles terminal and is sent by the Internet of Vehicles terminal,
    determining, by the network side device, a neighboring Internet of Vehicles terminal that is located from the Internet of Vehicles terminal by a distance less than or equal to a first threshold according to the current physical location information of the Internet of Vehicles terminal, and obtaining a radio resource occupied by the neighboring Internet of Vehicles terminal;
    according to the radio resource occupied by the neighboring Internet of Vehicles terminal, the network side device performs one of the following operations:
        allocating for the Internet of Vehicles terminal a radio resource that is in the same frequency band as that of a radio resource occupied by one of the neighboring Internet of Vehicles terminals having a largest distance to the Internet of Vehicles terminal; and
        allocating for the Internet of Vehicles terminal a radio resource that is in the same frequency band as that of the radio resource occupied by one of the neighboring Internet of Vehicles terminals having a time domain distance to the Internet of Vehicles terminal larger than a second threshold.

7. The method according to claim 6, wherein the RRC connection reconfiguration message carries mobility management information.

8. The method according to claim 6, wherein the RRC connection reconfiguration message carries information about a transmitting and/or receiving radio resource allocated to the Internet of Vehicles terminal for Internet of Vehicles communication.

9. The method according to claim 6, wherein determining that network handover is required to be performed for the Internet of Vehicles terminal comprises:
determining that network handover is required to be performed for the Internet of Vehicles terminal according to a received cell measurement report reported by the Internet of Vehicles terminal, and/or
detecting that a radio resource is re-allocated to the Internet of Vehicles terminal.

10. A mobility management method, which is applied to an Internet of Vehicles terminal, wherein the method comprises:
receiving an RRC connection reconfiguration message sent by a network side device; and
sending an RRC connection reconfiguration completion message carrying current physical location information of the Internet of Vehicles terminal to the network side device after completing reconfiguration of a radio resource according to the RRC connection reconfiguration message,
wherein the radio resource is allocated by the network side device according to radio resources occupied by neighboring Internet of Vehicles terminals of the Internet of Vehicles terminal through one of the following operations:
allocating for the Internet of Vehicles terminal the radio resource that is in the same frequency band as that of a radio resource occupied by one of the neighboring Internet of Vehicles terminals having a largest distance to the Internet of Vehicles terminal; and
allocating for the Internet of Vehicles terminal the radio resource that is in the same frequency band as that of the radio resource occupied by one of the neighboring Internet of Vehicles terminals having a time domain distance to the Internet of Vehicles terminal larger than a second threshold.

11. The method of claim 10, wherein the RRC connection reconfiguration message carries mobility management information.

12. The method according to claim 10, wherein the RRC connection reconfiguration message carries information about a transmitting and/or receiving radio resource allocated to the Internet of Vehicles terminal for Internet of Vehicles communication.

13. The method according to claim 10, further comprising: reporting a cell measurement report to the network side device.

14. The method according to claim 10, wherein the current physical location information of the Internet of Vehicles terminal carries current motion state information of the Internet of Vehicles terminal.

15. The method according to claim 14, wherein the current motion state information of the Internet of Vehicles terminal comprises at least one of: a current running speed, a running direction, and an acceleration of the Internet of Vehicles terminal.

* * * * *